(12) United States Patent
Drinkard, Jr.

(10) Patent No.: US 6,264,909 B1
(45) Date of Patent: Jul. 24, 2001

(54) NITRIC ACID PRODUCTION AND RECYCLE

(75) Inventor: William F. Drinkard, Jr., Charlotte, NC (US)

(73) Assignee: Drinkard Metalox, Inc., Charlotte, NC (US)

( * ) Notice: Subject to any disclaimer, the term of this patent is extended or adjusted under 35 U.S.C. 154(b) by 0 days.

(21) Appl. No.: 09/334,137

(22) Filed: Jun. 15, 1999

Related U.S. Application Data

(63) Continuation-in-part of application No. 08/608,726, filed on Feb. 29, 1996, now Pat. No. 5,912,402.

(51) Int. Cl.⁷ .................................................. C01B 21/38
(52) U.S. Cl. ........................................ 423/390.1; 423/393
(58) Field of Search ................................ 423/393, 390.1

(56) References Cited

U.S. PATENT DOCUMENTS

| | | | |
|---|---|---|---|
| 4,062,928 | * 12/1977 | Applegate et al. | 423/393 |
| 4,081,518 | * 3/1978 | Selin et al. | 423/393 |
| 4,276,277 | * 6/1981 | Aguinet et al. | 423/393 |
| 4,309,396 | * 1/1982 | Herbrechtsmeier et al. | 423/393 |
| 4,372,935 | * 2/1983 | Botton et al. | 423/393 |
| 4,419,333 | * 12/1983 | Reus et al. | 423/393 |
| 4,562,052 | * 12/1985 | Grab et al. | 423/393 |
| 5,017,348 | * 5/1991 | Lerner | 423/393 |

* cited by examiner

*Primary Examiner*—Wayne Langel
(74) *Attorney, Agent, or Firm*—Dougherty & Clements LLP

(57) ABSTRACT

An improved process for either the manufacturing of nitric acid, recycling of nitric acid, or recovering of nitric acid, comprising the steps of: providing a source of $NO_x$; reacting NO from the source of $NO_x$ with $HNO_3$ in the presence of $NO_2^-$ to produce a resulting product; and reacting the resulting product with $O_2$ and $H_2O$ to produce nitric acid.

48 Claims, No Drawings

NITRIC ACID PRODUCTION AND RECYCLE

CROSS-REFERENCE TO RELATED APPLICATION

This application is a continuation-in-part of U.S. application Ser. No. 08/608,726, filed Feb. 29, 1996 U.S. Pat. No. 5,912,402.

FIELD OF THE INVENTION

The present invention relates to a method for breaking the NO to $NO_2$ cycle in the production of nitric acid and the recovery of nitric oxide, and more particularly to apparatus and methods for the quantitative recycle of $NO_x$ gas, recovery, and the production of nitric acid without the need to discharge $NO_x$.

BACKGROUND OF THE INVENTION

The mathematically infinite cycle of gas phase oxidation of nitric oxide (NO) to nitric dioxide ($NO_2$) and partially back to nitric oxide has dominated nitric acid production and the recovery of nitric oxide.

The nitric oxide to nitric dioxide cycle, which has been the limiting reaction for all nitric acid processes since processes based upon the catalytic oxidation of ammonia began, is described in the following equations:

$$4NH_3(g) + 5O_2(g) \rightarrow 4NO(g) + 6H_2O(g) \quad (1)$$

$$2NO(g) + O_2(g) \rightarrow 2NO_2(g) \quad (2)$$

$$3NO_2(g) + H_2O(l) \rightarrow 2HNO_3(l) + NO(g) \quad (3)$$

Equations (2) and (3) describe the cycle eliminated by the present invention. As can be seen from equations (2) and (3), the reaction of every three moles of $NO_2$ with water to form two moles of nitric acid return one of the three moles of oxidized nitrogen as NO. This, of course, requires a reoxidation of the NO with an additional $O_2$ from air or other source.

Mathematically, one-third of the oxidized nitrogen has to be reoxidized with oxygen every time that two-thirds are reacted with water to form nitric acid.

The economic and environmental problems created by the currently practiced gas phase oxidation of nitric oxide (NO) have dominated and shaped the nitric acid industry since its inception in 1908 when Professor Ostwald piloted the first production of nitric acid based on the catalytic oxidation of ammonia ($NH_3$) to nitric oxide (NO).

There are three variables controlling the gas-phase oxidation or reoxidation of NO to $NO_2$, Eq. (2). They are:

a. NO concentration vs. $O_2$ concentration;
b. Temperature: the reaction time decreases with lower temperatures;
c. Pressure: the need to achieve a termolar reaction requiring two molecules of NO and one molecule of $O_2$ decreases the time required for the oxidation of NO with $O_2$ to the third power of the pressure in which the reaction occurs.

This has resulted in the industry's development and use of expensive high pressure plants.

As currently practiced, these reactions require the return of one-third of the nitric dioxide to the gas phase as nitric oxide (NO), Eq. (3), which then re-requires the termolar reaction to nitric dioxide ($NO_2$), Eq. (2), and then an additional liquid phase reaction to convert two-thirds of this $NO_2$ to nitric acid ($HNO_3$), with one-third of the entering $NO_2$ again being returned to the gas phase as NO for an additional gas phase reaction, and so on.

This currently used series of reactions is an exercise in commercially striving to reach infinity. Of course, in the current practice of the art of nitric acid manufacture, economics dictate that at some point in this infinite series of reactions, whenever enough of the nitric oxides have been converted to nitric acid so that their further recycle adversely affects the economies of the further recycle process, they are wasted. This results in atmospheric discharge of $NO_x$.

In U.S. Pat. No. 3,991,167, Depommier et al. of the firm Produits Chimiques Ugine Kuhlmann point out that current nitric acid from ammonia produces exhaust gases containing from 1,000 to 2,000 $cm^3$ of nitrogen oxides per cubic meter of effluent while recent legislation seeks to impose a limit of about 200 $cm^3$ of nitrogen oxides per cubic meter of tail gases.

They further add that the progressive process, Equation (3), previously described makes it "extremely difficult to absorb the last traces of nitrogen oxides in the absorption system conventionally used in manufacturing nitric acid" (column 1, lines 61–63).

Attempts to lower the amounts of released nitrogen oxides by mere extension of the absorption system are fraught with difficult technical problems. Also, the additional installations would entail considerably increased investments. (Column 2, lines 1–6).

Depommier continues (Column 2, lines 15–48) to outline many of the difficulties existing with current nitric oxide emission control processes.

Typical discharge rates from such plants are about 3.9 MT (metric ton) of gases being discharged per each MT of 100% $HNO_3$ produced. The discharged gases contain a typical concentration of 0.02% to 0.20% $NO_x$.

With worldwide nitric acid production for 1985 estimated at greater than 30 million MT per year, this represents an atmospheric discharge of 23,400 to 234,000 MT of $NO_x$ per year.

Because of environmental regulations and the fact that such discharges are often marked with a disturbing reddish-brown color, most nitric acid plant discharges in the U.S.A. and in other environmentally conscious parts of the world are being treated either to obscure the discharge or to react the discharged $NO_x$ into another chemical form.

Earlier, the most common treatment was catalytic reaction with excess natural gas which served to reduce, dilute, and disperse the discharged nitric oxides, which made the reddish-brown fume invisible and added unreacted natural gas to the atmosphere.

Current technology is an expensive add-on consisting of ammonia gas, which is added in excess and catalytically reacted with the $NO_x$ to form nitrogen and ammonium nitrate, which is kept at a sufficiently high temperature to prevent a visible white fume of ammonia nitrate, as it is being discharged into the atmosphere. An excess of ammonia is usually required for this reaction which also discharges chemicals into the atmosphere.

In addition to the above economic and environmental losses caused by the nitrogen dioxide to nitric oxide cycle, there is also the economic burden caused by Eq. (2) in which two moles of NO are required to contact one mole of oxygen in order to form two moles of $NO_2$. This also is repeated again and again by the cycle.

In applying Eq. (2) to obtain a sufficiently close contact to effect a reasonably economic rate of molecular reactions between nitric oxide and oxygen, plants are operated at elevated pressures. The attainment of these pressures requires expensive turbo compressor sets and expensive high pressure stainless steel construction of all equipment under pressure.

Freitag and E. Scheibler, who are experts from the Uhde Co., one of the largest and the oldest suppliers of nitric acid plants and processes in the world, state in *Handbook of Chemical Production Processes*, Robert A. Meyers, editor, p. 3.6–24, 1986, under their description of "Uhde Nitric Acid Processes" that such turbo compressor sets represent 25–30% of the total cost of a conventional nitric acid plant.

The elevated pressures used to increase the reaction rate also causes greater losses of the expensive platinum catalyst and lower efficiencies in ammonia oxidation and conversion to nitric acid.

Typical Performance Figures for $NH_3$ Combustion, provided by W. Freitag and E. Scheibler, in their report on Uhde Nitric Acid Processes, previously mentioned, give platinum catalyst consumption at 55 mg/MT $HNO_3$ produced at one atmosphere pressure (0.1 MPa abs.) and 280 mg/MT HNO3 produced at ten atmospheres of pressure (1.0 MPa abs.). Some of this platinum can be recovered in downstream filters but in all cases platinum costs are substantially higher at the higher operating pressures which are used in current nitric acid production.

Ammonia conversion to nitric oxide and subsequently to nitric acid suffers also. In the Freitag and Scheibler reference cited above regarding the conversion of ammonia to nitric oxide ($NH_3 \rightarrow NO$), the percentage oxidized to nitric oxide (NO) drops from 97.5% at 0.1 MPa abs. to 94.0% at 1.0 MPa abs., a loss of 3.5%.

Experts and theory teach that dissolved trivalent nitrogen dissolved in nitric acid cannot be practically oxidized by oxygen alone or in air to additional nitric acid.

This is cogently expressed by Bernard J. Lerner of the Beco Engineering Company in U.S. Pat. No. 5,017,348, column 4, lines 49–55:

"The singular and consistent deficiency of the prior art discussed above is the failure to recognize that treating $HNO_2$ in solution with air or oxygen in an open system will remove from solution the very reactants, $HNO_2$ and NO, that require liquid-phase oxidation. This causes continuous, open-ended removal of NO from the solution, whether air or pure oxygen is used."

SUMMARY OF THE INVENTION

The invention provides a method for rapidly removing nitric oxide (NO) from the gas phase by reaction with catalyzed nitric acid. The reaction forms a complex believed to be nitric trioxide ($N_2O_3$) in solution.

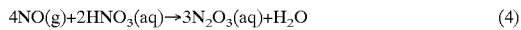

$$4NO(g)+2HNO_3(aq) \rightarrow 3N_2O_3(aq)+H_2O \qquad (4)$$

The homogeneous catalyst required is a concentration of the dissolved +3 valence nitrogen complex which can be expressed as $N_2O_3$ or nitrite ($NO_2$) ion. When sufficient +3 valence nitrogen is present, the reaction is both rapid and quantitative for all nitric oxide supplied or formed in the nitric acid.

Although most texts on nitric acids and nitric oxides state that $N_2O_3$ is rare or difficult to form, the present invention produces it rapidly and at such high concentrations that, if desired, one can form a concentrated dark blue, ink-like solution of $N_2O_3$ in nitric acid and water.

The other part of the present invention which breaks the NO to $NO_2$ gas phase cycle is the discovery that, in the above solution, one can achieve rapid, quantitative oxidation of the $N_2O_3$ in the liquid phase rather than the conventional gas phase.

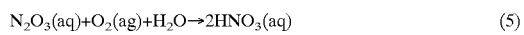

$$N_2O_3(aq)+O_2(ag)+H_2O \rightarrow 2HNO_3(aq) \qquad (5)$$

Unlike current practice, there is no return of NO or $NO_2$ back to the gas phase. The cycle is broken.

Surprisingly, the reaction and subsequent solvation of nitric oxide (NO), whether supplied alone, as a mixture of nitrogen oxides ($NO_x=NO_2+NO$), or from the reaction of nitrogen dioxide (NO2) and water, Eq. 3 with the catalyzed nitric acid was so rapid that the need for countercurrent flow of $NO_x$ containing gases into nitric acid and the accompanying expensive and complicated equipment countercurrent flow requires is completely eliminated.

For example, in Grab et al. (U.S. Pat. No. 4,562,052, Column 4, Lines 15–18), the off gas nitrogen oxides being treated require a countercurrent flow absorption column and a second absorber (Column 4, Lines 24–26). Neither of these is required for the practice of the present invention.

Reus also requires "a plate column as the first absorption stage." (Column 3, Lines 63–64) for countercurrent absorption of nitric oxide into nitric acid. Again, (Column 4, Lines 16–18), the requirement for countercurrent nitric oxide flow to the absorption solution is repeated, thus clearly differentiating my invention from Reus.

Selin et al. (U.S. Pat. No. 4,081,518) only teaches nitrogen oxides ($NO_x$) concentration and return as such to a mainstream nitric manufacturing facility for gas phase oxidation by conventional means. He also states his requirement for countercurrent flow in his abstract and throughout his patent.

Lerner (U.S. Pat. No. 5,017,348) in FIG. 1 and FIG. 2 clearly indicates the requirements of his invention for absorption equipment and countercurrent flow of the $NO_x$ into his uncatalyzed nitric acid. (Column 8, Lines 10–12) "A 4-inch diameter countercurrent gas-liquid absorber, packed to a depth of 4 feet with ½-inch stainless steel Raschig rings . . . " Lerner also teaches that oxygen addition under pressure is desirable.

Lerner's countercurrent absorption equipment and pressurized oxygen both clearly show that he did not anticipate the invention set forth herein:

1. The maintenance of a level of trivalent nitrogen in the scrubbing nitric acid expressed as $N_2O_3$ or $NO_2$ allows rapid reaction and incorporation of NO from any source into the nitric acid and allows a high level of dissolved trivalent nitrogen to be maintained.
2. The ability to form and maintain a high level of trivalent nitrogen in solution frees the supplied oxygen from its slow reaction heretofore limited by the availability of trivalent nitrogen to a rapid reaction of great commercial opportunity.

It is the ability of the present invention to obtain and maintain high $N_2O_3$ in solution which allows the rapid liquid phase reaction of $N_2O_3$ with $O_2$, that allows the process to be operated so that $O_2$ entering the $N_2O_3$ aqueous solution is completely reacted, so that no $O_2$ (g) escapes the liquid surface.

As opposed to what would currently be expected from the current state of the art as quoted earlier from Bernard J. Lerner, the addition of air or oxygen in an open system does not remove from solution the very reactants, $HNO_2$ and NO, that require liquid-phase oxidation.

The complex trivalent nitrogen created by the practice of my invention is present not as dissolved NO or easily dissociated/decomposed $HNO_2$ but as a concentrated dimerized or polymerized trivalent nitric oxide $(N_2O_3)_x$ which is only slightly dissociated into nitrite ion ($NO_2^-$).

The ability of the complex to capture, stabilize and supply oxidizable nitric oxides in solution allows liquid phase oxidation by oxygen or oxygen containing gases at such high rates that oxygen added to the properly maintained solution (a light to dark green color) reacts so rapidly that the bubbles never reach the surface.

When pure oxygen is supplied, the process can be operated in a totally sealed system. No $NO_x$ discharge is required.

Reus et al. (U.S. Pat. No. 4,419,333) has a problem achieving a reasonable rate of oxygen reaction and states (Column 3, Lines 3 through 4), ". . . oxygen is not dissolved in nitric acid as well as the nitrous gases" and then goes into considerable detail on methods of increasing (Lines 6–8) "the possible residence time of the washing liquid laden with oxygen." The paragraph concludes with the comment (Lines 21–24) "Preferably the purified gas mixture is additionally subjected to a known oxidation treatment with hydrogen peroxide." As practiced, my invention allows the immediate reaction of gaseous oxygen. If oxygen is not supplied at a sufficient rate and the process is not open to the atmosphere, the process will react with all oxygen in the system and a vacuum will be produced. Hydrogen peroxide is never required in the application of my invention.

The present invention is particularly useful as a portion of a method for treating Electric Arc Furnace (EAF) dust. In such method, EAF dust is dissolved in a nitric acid solution, and iron is precipitated from the solution by raising its pH and/or by elevating the temperature. The dust may first be leached in water. The resulting solution undergoes iron removal then heavy metal removal by electrolytic and/or sulfide precipitation then is evaporated and decomposed. The resulting product is leached in water to remove calcium nitrate. The resulting residue is treated with metal amine complexing agents such as ammonium carbonate, ammonium hydroxides, mixtures thereof and similar agents to recover the zinc values leaving manganese and magnesium values which are separated by acid. The nitric acid can be a solution of 10% to 100% nitric acid. Note that solutions of more than 70% nitric acid are more difficult to obtain and work with, so the working range is an aqueous solution of 30% to 70% nitric acid, and the preferred solution is 40% to 60% nitric acid. It is advantageous to employ a nitric recycle process, wherein nitric ($NO_x$) gases exuded during the reacting of nitric acid solution with metallurgical dust are recycled into nitric acid by a nitric recycle process.

OBJECTS OF THE INVENTION

The principal object of the present invention is to provide an improved method of effectively and economically recycling $NO_x$ into nitric acid.

Another object of this invention is to provide a method of breaking the mathematically infinite cycle of gas phase oxidation of nitric oxide (NO) to nitric dioxide ($NO_2$) which, on reaction with water, partially reverts to nitric oxide.

Another object of the invention is to provide a process for the recovery of nitric acid without the evolution of the gaseous nitrogen oxides to the environment.

Another object of the invention is to provide a process for increasing the concentration of nitric acid without the need for evaporation.

A further object of the invention is to provide a process for forming a trivalent nitrogen concentration in solution which can be rapidly reacted with gaseous oxygen.

Still another object of the invention is a process for the economical production and manufacture of nitric acid at atmospheric pressure while reducing or eliminating harmful environmental emissions.

DETAILED DESCRIPTION

Part of the invention is the discovery that one can rapidly remove nitric oxide (NO) from the gas phase by reaction with catalyzed nitric acid. The reaction forms trivalent nitrogen in solution.

$$4NO(g)+2HNO_3(aq) \rightarrow 3N_2O_3(aq)+H_2O \quad (6)$$

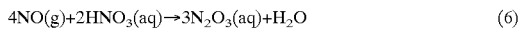

The homogeneous catalyst is dissolved trivalent nitrogen which can be expressed as ($NO_2^-$) or $N_2O_3$. When sufficient trivalent ion is present, the reaction is both rapid and quantitative. Insufficient solubilized trivalent nitrogen, which is easily recognized by the brown to clear color of the contacting nitric acid allow the commonly observed escape of nitric oxide back into the gas phase.

Although texts on nitric oxides state that $N_2O_3$ is rare or difficult to form, the present invention produces it rapidly and at such high concentrations that, if desired, one can form a dark blue, ink-like solution of $N_2O_3$ in nitric acid and water.

The other part of the present invention which breaks the NO to $NO_2$ gas phase cycle is the discovery that in the above solution, one can achieve rapid, quantitative oxidation of the $N_2O_3$ in the liquid phase with dissolved oxygen rather than the conventional gas phase.

$$N_2O_3(aq)+O_2(aq)+H_2O(l) \rightarrow 2HNO_3(aq) \quad (7)$$

The maintenance of excess to stoichiometric trivalent nitrogen oxides in solution allows rapid oxygen addition with no need to release oxygen into the gas phase.

Unlike current practice, there is no return of NO or $NO_2$ to the gas phase. The cycle is broken.

It is the present invention's ability to obtain high $N_2O_3$ in solution and effect a rapid liquid phase reaction of $N_2O_3$ with $O_2$. The reaction allows the process to be operated so that no $O_2$ enters the gas phase and none is required in the gas phase.

A major problem in the recycling of $NO_x$ back to reusable nitric acid is the difficulty of concentrating the volatile acid. In my invention, the continued supply of $NO_x$ ($NO+NO_2$) into the scrubbing nitric acid and its oxidation to additional nitric acid effectively raises the concentration of the combined nitric acids.

Absorption and reaction rates are so efficient and rapid that the process can be effected with equipment as simple as a spray or inductor to capture the NO, followed by dispersion of $O_2$ gas into the resulting liquid, resulting in nitric acid from NO, $O_2$, and $H_2O$.

The expensive pressure and multi-mass-transfer equipment, such as absorption columns, packed towers, bubble caps, etc. that is currently required for nitric acid production and nitric oxide recovery, is not required when practicing this invention.

The invention is a process which consists of the following steps:

1) Establishment and maintenance of a proper dissolved +3 valence nitrogen expressed as ($N_2O_3/NO_2^-$) level in a nitric acid scrubbing solution.
   NO Option: 1.0 to 20.0 g/l as reacted NO in complex
   NO Range: 0.1 to 40.0 g/l as reacted NO in complex
   $HNO_3$ Option: 15 to 55% $HNO_3$
   $HNO_3$ Range: 5 to 65% $HNO_3$
2) Removal of NO from gas phase by reaction with $HNO_3$ containing $NO/N_2O_3$, as described in step 1), above.

3) Maintenance of NO in optimum range by reaction with $O_2$.

$$N_2O_3 + O_2 + H_2O \rightarrow 2HNO_3 \quad (8)$$

If the $N_2O_3$ is maintained in the optimum range, the reaction of additional NO with $HNO_3$ is rapid and quantitative and only a single or at most several mass transfer stages are required. The same is true of the $O_2$ reaction. No pressure is required.

When practiced as described, NO gas is immediately and quantitatively reacted into the liquid phase. The resulting solution is maintained with an excess of reacted trivalent nitric oxides. When operated to hold the trivalent nitrogen within the recommended limits NO escape from solution is practically nil.

When oxygen contacts this solution, it is immediately and quantitatively reacted with the dissolved nitric oxide (NO) to form nitric acid ($HNO_3$). As practiced, no $O_2$ (g) entering the $N_2O_3$ solution is discharged from the solution into the gas phase. The ultimate oxidation of NO to $HNO_3$ totally occurs in the liquid phase. No additional oxidant, such as $H_2O_2$, is required.

If $NO_2$ is present either from the process which is evolving the $NO_x$ or by gas phase oxidation where oxygen is present in the gases being supplied to the present invention, it is converted to $HNO_3$ and NO by the water present in the scrubbing $HNO_3/NO_2$ solution as in Eq. (3). The resulting NO is reacted with the catalyzed nitric acid and is oxidized in the liquid phase by the oxygen supplied. If desired, oxygen can be withheld and the resulting $N_2O_3/HNO_3$ solution can be stored or transferred to another site for oxidation to nitric acid at any convenient time.

ALTERNATIVE EMBODIMENTS

Alternatively this process for generating nitric acid ($HNO_3$) can be described as comprising the steps of: one, reacting a +2 oxidation gaseous nitrogen (NO), as shown in Table 1, with a +5 oxidation nitrogen in solution ($HNO_3$) to obtain a +3 oxidation nitrogen in solution ($N_2O_3$); and two, reacting the +3 oxidation nitrogen ($N_2O_3$), in the solution, with oxygen ($O_2$) and water ($H_2O$) to produce a +5 oxidation nitrogen ($HNO_3$) while maintaining a level of a +3 oxidation nitrogen ($N_2O_3$) in excess of added oxygen ($O_2$). The oxidation state also can be referred to as the valence state.

The process allows the use of oxygen which is transferred to oxidizable substances, such as ores, metals and organic compounds, as nitric acid to accomplish oxidations under conditions in which oxygen would be normally inert, for example, low pressures such as atmospheric, mild to low temperatures, low oxygen concentrations, etc.

TABLE 1

| OXIDATION | STATES OF NITROGEN |
| --- | --- |
| +6 | $NO_3$, Nitrogen trioxide |
| +5 | $N_2O_5$, $HNO_3$, Nitrates |
| +4 | $NO_2$, Nitrogen dioxide, $N_2O_4$ |
| +3 | $N_2O_3$, $HNO_2$, Nitrite |
| +2 | NO, Nitric oxide |
| +1 | $N_2O$, Nitrous oxide |
| 0 | $N_2$, Nitrogen |

EXAMPLES

Apparatus is set up with a source of nitric oxides and two or three nitric absorption vessels consisting of one-liter reactors containing nitric acid containing trivalent nitrogen. The scrubbing or reactant nitric acid is continuously circulated through a laboratory inductor. This supplies the energy required to circulate the nitric oxides through the vessels.

The vessels are connected in a continuous loop.

EXAMPLE 1

An excess of arsenic trioxide ($As_2O_3$) is added to 4.536 Kg of 50% nitric acid $HNO_3$. The resulting nitric oxide (NO) is drawn through three spray scrubbers, the spray being a trivalent nitrogen containing solution of 20% $HNO_3$ supplied by a single storage flask from which the reactant nitric acid is drawn and returned.

As the trivalent nitrogen content of the scrubbing nitric builds from its initial level of 3.2 g/l expressed as NO, gaseous oxygen is reacted with the scrubbing solution by adding it directly to the scrubbing solution.

Oxygen addition is adjusted so as to maintain an excess of trivalent nitrogen in solution. No oxygen escapes into the head space.

As this cycle continues, the collected and oxidized nitric oxide increases the concentration of the scrubbing nitric.

Recovered nitric acid is 2.268 Kg as 100% $HNO_3$ or 100% of the supplied NO has been converted to nitric acid by the invention. The addition of this 2.268 Kg to the initial scrubbing nitric acid raises its concentration to 47.8%.

EXAMPLE 2

A gaseous mixture of $NO_x$ with stoichiometric oxygen was passed through two reactors as described above. Reactant nitric acid containing 4.1 grams per liter of dissolved $N_2O_3$ complex expressed as NO was divided into two one-liter glass reactors and recirculated within each individual reactor.

The total amount of nitric oxides fed into the system was 63.86 grams expressed as nitric acid.

The amount of nitric oxide recovered as nitric acid was 64.63 g., which was a recovery of 101.2%, essentially full recovery.

In the first absorber, 97.8% of the nitric oxide was recovered and 2.2% was recovered in the second absorber.

SUMMARY OF THE ACHIEVEMENT OF THE OBJECTS OF THE INVENTION

From the foregoing, it is readily apparent that I have invented an improved method that is both environmentally and economically effective for nitric acid production and for recycling $NO_x$ into nitric acid. This method breaks the mathematically infinite cycle of gas phase oxidation of nitric oxide (NO) to nitric dioxide ($NO_2$) and back to nitric oxide when nitric dioxide ($NO_2$) is reacted with water to nitric acid. Further, this invention provides a process for the recovery and production of nitric acid without the evolution of the gaseous nitrogen oxides into the environment.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A process for producing nitric acid comprising the steps of:

reacting nitric oxide (NO) with nitric acid ($HNO_3$) in aqueous solution to form nitric trioxide ($N_2O_3$) in aqueous solution; and oxidizing the nitric trioxide $N_2O_3$) with oxygen in aqueous solution to form nitric acid ($HNO_3$) while maintaining the concentration of said nitric trioxide ($N_2O_3$) between 0.1 to 40.0 g/l.

2. The process according to claim 1 wherein the oxygen is gaseous.

3. The process according to claim 1 wherein the nitric oxide and nitric acid react during co-current flow thereof.

4. The process according to claim 2 wherein the oxygen source is air.

5. The process according to claim 1 wherein the nitric trioxide ($N_2O_3$) concentration is maintained between 1.0 to 20.0 g/l.

6. The process according to claim 1 wherein the nitric acid concentration is maintained from 5 to 65% nitric acid.

7. The process according to claim 6 wherein the nitric acid concentration is maintained from 15 to 55% nitric acid.

8. The process according to claim 1 wherein the formation of $N_2O_3$ occurs in the presence of an $NO_2$-catalyst.

9. A method of producing nitric acid which comprises the steps of:
   providing a source of $NO_x$;
   reacting NO from said source of $NO_x$ with $HNO_3$ in the presence of $NO_2^-$ catalyst to produce $N_2O_3$; and
   reacting said $N_2O_3$ with $O_2$ and $H_2O$ to produce nitric acid while maintaining the concentration of said $N_2O_3$ between 0.1 and 40.0 g/l.

10. A method of producing nitric acid according to claim 9 wherein said source of $NO_x$ is comprised mostly of NO.

11. A method of producing nitric acid according to claim 9 wherein said $NO_x$ is in a gaseous state.

12. A method of producing nitric acid according to claim 9 wherein reaction of NO with $HNO_3$ occurs during co-current flow thereof.

13. A method of producing nitric acid according to claim 9 wherein said $O_2$ is in a gaseous state.

14. A method of producing nitric acid according to claim 9 wherein said $O_2$ is from atmospheric air.

15. A method of producing nitric acid according to claim 9 wherein said $HNO_3$ is in a liquid state.

16. A method of producing nitric acid according to claim 9 wherein the concentration of said $HNO_3$ ranges from 5% to 65%.

17. A method of producing nitric acid according to claim 9 wherein the concentration of said $HNO_3$ ranges from 15% to 55%.

18. A method of producing nitric acid according to claim 9 wherein said $NO_2^-$ is in aqueous solution.

19. A method of producing nitric acid according to claim 9 wherein said method is performed at atmospheric pressure.

20. A process of producing nitric acid which comprises the steps of:
   providing a source of $HNO_3(1)$;
   reacting a portion of said $HNO_3(1)$ with an oxidizable substance to generate $NO_x$;
   reacting NO from said $NO_x$ with $HNO_3(1)$ to produce nitric trioxide ($N_2O_3$) in aqueous solution; and
   reacting said nitric trioxide ($N_2O_3$) with $O_2$ and $H_2O$ to form additional $HNO_3(1)$ while maintaining the concentration of said nitric trioxide ($N_2O_3$) between 0.1 to 40.0 g/l.

21. A process of producing nitric acid according to claim 20 wherein said source of $NO_x$ is comprised mostly of NO.

22. A process of producing nitric acid according to claim 20 wherein $NO_x$ is in a gaseous state.

23. A process of producing nitric acid according to claim 20 wherein said NO and said $HNO_3$ react while moving in co-current flow.

24. A process of producing nitric acid according to claim 20 wherein $O_2$ is in a gaseous state.

25. A process of producing nitric acid according to claim 20 wherein $O_2$ is from atmospheric air.

26. A process of producing nitric acid according to claim 20 wherein the concentration of said $HNO_3(1)$ ranges from 5% to 65%.

27. A process of producing nitric acid according to claim 20 wherein the concentration of said $HNO_3(1)$ ranges from 15% to 55%.

28. A process of producing nitric acid according to claim 20 further comprising maintaining trivalent nitrogen in aqueous solution while the reaction is occurring.

29. A process of producing nitric acid according to claim 20 wherein said process is performed at atmospheric pressure.

30. A process of producing nitric acid according to claim 20 wherein said $HNO_3$ is in a liquid state.

31. A process of producing nitric acid according to claim 20 further comprising the step of providing a $NO_2^-$ catalyst when reacting NO with $HNO_3$.

32. A process of producing nitric acid according to claim 20 wherein $NO_2$ from said source of $NO_x$ is reacted with $H_2O$ to produce $HNO_3$ and NO.

33. A method of manufacturing nitric acid which comprises providing a source of $NO_x$, reacting NO from said source of $NO_x$ with $HNO_3$ (aq) in the presence of $NO_2^-$ to produce nitric trioxide ($N_2O_3$) in aqueous solution and reacting said nitric trioxide with $O_2$ and $H_2O$ while maintaining the concentration of said nitric trioxide $N_2O_3$ between 0.1 to 40.0 g/l.

34. A process for generating nitric acid ($HNO_3$) comprising the steps of:
   reacting a +2 valence gaseous nitrogen with a +5 valence nitrogen in solution to obtain a +3 valence nitrogen in solution;
   maintaining the +3 valence nitrogen in solution at a concentration from 0.1 to 40.0 g/l; and,
   reacting the +3 valence nitrogen, in said solution, with oxygen and water to produce nitric acid while maintaining a level of +3 valence nitrogen in excess of added oxygen.

35. A process according to claim 34 wherein excess oxygen is added to produce a clear +3 valence-free nitric acid.

36. A process according to claim 34 wherein oxygen added is gaseous oxygen.

37. A process according to claim 34 wherein oxygen added is supplied as air.

38. A process according to claim 34 wherein oxygen added is contained in other gases.

39. A process according to claim 34 wherein the +3 valence nitrogen is $N_2O_3$.

40. A process according to claim 34 wherein the +3 valence nitrogen concentration is maintained from 1.0 to 20.0 g/l as $N_2O_3$.

41. A process according to claim 34 wherein the +2 valence nitrogen addition is continually reacted with the +5 valence nitrogen to produce a +3 valence nitrogen which is continuously oxidized with oxygen to continuously increase the concentration of the resulting nitric acid.

42. A process according to claim 41 wherein the operating +5 valence nitrogen in solution concentration range is 15 to 55% nitric acid.

43. A process according to claim 41 wherein the operating +5 valence nitrogen in solution concentration can be effective from 5 to 65% nitric acid.

44. A process according to claim 34 wherein the +2 valence nitrogen addition is repeatedly reacted with the +5 valence nitrogen to produce a +3 valence nitrogen, which is repeatedly oxidized with oxygen to produce a +5 valence nitrogen thereby increasing concentration of the resulting nitric acid.

45. A process according to claim 44 wherein the operating +5 valence nitrogen in solution concentration range is from 5 to 65% nitric acid.

46. A process according to claim 45 wherein the operating +5 valence nitrogen in solution concentration range is from 15 to 55% nitric acid.

47. A method of increasing nitric acid concentration which comprises the steps of:

providing a source of $NO_x$;

reacting NO from said source of $NO_x$ with $HNO_3$ (aq) to produce $N_2O_3$ (aq); and reacting said $N_2O_3$ (aq) with $O_2$ and $H_2O$ to produce nitric acid having a higher concentration while maintaining the concentration of said nitric trioxide $N_2O_3$ between 0.1 to 40.0 g/l.

48. A process for producing nitric acid comprising the step of reacting nitric oxide (NO) with nitric acid ($HNO_3$) in aqueous solution to form nitric trioxide ($N_2O_3$) that is simultaneously oxidized with oxygen in aqueous solution to form nitric acid ($HNO_3$) while maintaining the concentration of said nitric trioxide $N_2O_3$ between 0.1 to 40.0 g/l.

* * * * *